United States Patent Office 3,516,947
Patented June 23, 1970

3,516,947
CATALYSTS HAVING STABLE FREE RADICALS CONTAINING SULFUR
Zdzislaw F. Dudzik, Eastview, Ontario, Canada, assignor to Canadian Patents and Development Limited, Ottawa, Ontario, Canada, a corporation of Canada
No Drawing. Filed May 4, 1967, Ser. No. 635,991
Int. Cl. B01j 11/74; C10g 11/06
U.S. Cl. 252—439         14 Claims

ABSTRACT OF THE DISCLOSURE

Process for impregnating siliceous crystalline materials as silica, silicates and aluminosilicates with sulphur-containing free radicals to provide catalysts for hydrocarbon conversion processes and lazurite-type gem stones.

---

It is an object of this invention to provide siliceous catalysts which have enhanced activity in hydrocarbon conversion processes due to the presence in their structures of very active and stable (under the conditions of catalytic reaction) centres having sulfur-containing free radicals.

In accordance with the present invention, it has now been found that unusually effective siliceous catalysts can be prepared by introducing active centres having sulfur-containing free radicals into crystalline silica, silicate, and aluminosilicate structures, as for example, kaolin, other common clays, natural and synthetic zeolites, natural and synthetic molecular sieves, and the like.

The method according to the present invention consists in the impregnation of these siliceous materials with sulfur-containing free radicals by heating said materials in the absence of excess oxygen and in the presence of one of the group consisting of elementary sulfur, polysulfides, elementary sulfur and sulfide, and elementary sulfur and polysulfides to a temperature in the range of from about 200° C. to 1200° C., preferably 350° C. to 700° C., under pressures ranging from vacuum to high pressures, e.g., 10 atm. Although an amount of sulfur compound of at least about 5% by weight, based on the weight of the siliceous material to be impregnated, may be used, an excess of the sulfur compound is desirable. The sulfide and polysulfide may be selected from the group consisting of alkali metal and alkaline earth metal sulfides and polysulfides, preferably sodium sulfide and sodium and potassium polysulfides. The sulfur-containing free radicals can be introduced into any silica, silicate or aluminosilicate, such as sodium, potassium and calcium aluminosilicates, provided these materials are porous, preferably with pores of between about 3 and about 90 angstrom units (A.) in diameter. A pore diameter less than about 60 A. has been found necessary for molecular sieves. If the pore size of the siliceous material is larger than 90 A. in diameter, the catalytic activity of the treated material tends to be less stable.

The impregnation step may be preceded by a pretreatment step wherein the siliceous material is "activated" to remove entrapped moisture, gases and other contaminants, as by heating, heating and evacuation, washing and heating or the like.

As a special embodiment of this invention, a process is provided for the preparation from activated common aluminosilicates of a crystalline molecular sieve-type catalyst having trapped sulfur-containing free radicals. The method according to this specific embodiment consists in heating common aluminosilicates, as for example, kaolin, other common clays and the like, with alkali metal or alkaline earth metal polysulfides, preferably sodium or potassium polysulfides, to a temperature within the range of about 500° C. to about 1200° C., preferably 600° C. to 900° C. Following this heat treatment which causes changes in the crystal structure as well as introduces sulfur or polysulfide free radicals therein, a further heat treatment as described above may be carried out at a lower temperature to introduce additional sulfur-containing free radicals into the crystal structure.

A further embodiment of this invention is the preparation of a synthetic lazurite (*lapis lazuli*) having a strong blue colour suitable for use as a synthetic gem stone. This embodiment of the invention relates to a method of transforming common silica-containing minerals from the sodalite and nephelite groups and other natural and artificial zeolite crystals, especially sodalite and nepheline, characterized by having a uniform pore structure with pore diameters of between about 3 and 30 A., into the lazurite crystal structure. The method according to this special embodiment of the invention consists in a pretreatment step in which the mineral crystals are heated in a vacuum at a temperature in the range of about 100° C. to about 600° C., preferably 200° C. to 400° C., for about 2 to 48 hours, after which the crystals are impregnated with sulfur-containing free radicals by heating them in a furnace under outside pressure of an inert gas, such as nitrogen, helium or other noble gas or mixtures thereof, at about 100 to 2000 p.s.i. with sulfur, a polysulfide, or sulfur and a sulfide or mixtures thereof, to a temperature in the range of about 500° C. to about 1200° C., preferably 700° to 900° C., for about 12 to 120 hours, preferably 24 to 72 hours. The sulfide and polysulfide are preferably selected from the group consisting of alkali metal and alkaline earth metal sulfides and polysulfides.

Although there are probably many methods which could be used for preparing siliceous catalysts having catalytically-active centres with trapped sulfur-containing free radicals, the most convenient is to saturate the siliceous materials with sulfur or polysulfide vapors in a closed reactor or to carefully mix the finely divided siliceous materials with sulfur and/or polysulfide, in a closed reactor. In either case, the materials are slowly heated to a temperature within the range set out hereinbefore for a period of time sufficient to impregnate the crystal structure with sulfur-containing free radicals. The reaction time can be varied from a minimum of about 15 minutes to a maximum of several days.

The activated sulfur-containing catalyst of the present invention may be combined in finely divided form with a binder or dispersed in a matrix such as an inorganic oxide gel. Although the siliceous starting materials for preparing the catalysts may be treated directly with sulfur and/or sulfide, they may, alternatively, be combined with a suitable support or binder before such treatment. Solid porous absorbents, carriers and supports of the type usually employed in catalytic reactions may be used. Such materials include, for example, dried inorganic gelatinous precipitates of alumina, silica, zirconia, magnesia, thoria, titania, boria and combinations of these oxides with one another and with other components. Other suitable supports include mullite, kieselguhr, bauxite, silicon carbide, sintered alumina and various clays.

The activity of the siliceous sulfur-containing catalysts can be further promoted by activation with small amounts of oxygen, for example, 5 to 50 cc., preferably 10 to 20 cc., per gram of treated catalyst, in a flow of inert gas with a residence time of about ten seconds at elevated temperatures of from about 300° C. to about 600° C. prefereably 400° C. to 500° C. If the amount of oxygen is too large, the activity of the catalyst rapidly decreases; however, it can be restored almost completely by introducing small amounts of hydrogen into the flow.

When the activated siliceous catalysts of the present invention are inactivated for any reason as through continued use in hydrocarbon conversion processes, they can be regenerated by first burning off carbon deposits, then re-impregnating with sulfur-containing free radicals by the process described hereinbefore and optionally further activating by exposure to small amounts of oxygen.

Sulfur-containing free radicals can be identified in the silicate or aluminosilicate structure by means of electron spin resonance (ESR) spectra. The typical spectrum of these free radicals is either (a) a triplet structure with g-factors of approximately 2.047, 2.032 and 2.010 or (b) a single line with a g-factor between 2.014 and 2.032. By "free radical" is meant a molecule with one or more unpaired electron spins. By "sulfur-containing free radical" is meant a sulfur biradical ·S—(S)$_x$—S· (the "·" means an electron with unpaired free spin), sulfur radicals the $S_2^-$, $S_3^-$, $S_4^-$, etc., or radicals containing sulfur and oxygen as, for example, ·O—S—(S)$_x$—S—O·; where $x$ is an integer from two up to several hundred.

The triplet structure (a) is characteristic of a sulfur biradical; and the single line (b) is associated with the presence of free radicals derived from sulfur or sulfur-containing free radicals in silica, silicate or alumino-silicate structures. In some materials, especially kaolin, sulfur-containing catalytically-active centres which give rise to weak ESR signals (a) or (b) described above have been produced by the method of the present invention, thus indicating the presence of some free radical activity but not enough to account for the actual activity observed.

The stability of these sulfur-containing free radicals or active centres in the catalyst depends on the pore size, the amount of sulfur-containing free radicals in the cavities or pores, and the temperature of preparation. With large pore sizes, particularly above 60 A. in diameter, the free radicals are less stable. With increasing amounts of sulfur-containing free radicals in the structure, preferably up to saturation which in a zeolite structure is about 12 weight percent of sulfur, the observed stability is enhanced. As the temperature of preparation of the catalyst is increased within the indicated range, the stability of the introduced free radicals usually also increases.

In most cases, sulfur-containing free radicals trapped in aluminosilicate structures show remarkable stability. For instance:

(1) With Linde 3A Molecular Sieve material saturated with sulfur vapor and heated overnight to 450° C., no loss of ESR signal intensity was detected after heating at 200° C. in air, at 500° C. in helium, and at 450° C. in vacuum.

(2) With activated Linde 13X Molecular Sieve material mixed with $Na_2S_5$, heated overnight, then saturated with sulfur vapor and heated to 580° C., no marked loss of ESR signal intensity was detected after heating in vacuum at 500° C. and after a 24-hour exposure to hydrocarbon vapors at 500° C.

(3) With activated kaolin carefully mixed with sodium polysulfide, heated to 750° C., and activated with a small amount of oxygen at 500° C. the ESR signal intensities given in Table I were observed.

TABLE I.—ESR SIGNAL INTENSITIES

| | Spins/1 g |
|---|---|
| Catalyst 3 | $6 \times 10^{16}$ |
| After oxidation in air flow for 12 hours at 600° C. | $2 \times 10^{16}$ |
| After heating in H$_2$-flow for 24 hours at 500° C. | $3 \times 10^{16}$ |
| After exposure to hydrocarbon cracking for 48 hours at 500° C. | $2.5 \times 10^{16}$ |

The intensity of the ESR signal, a measure of the amount of free radicals trapped in the crystals in pores and/or in cavities, varies considerably depending on the process of preparing it and the siliceous material used in the process. Thus, Linde 3A Molecular Sieve material saturated with sulfur vapor and heated overnight to 450° C. has at 27° C. a ratio of sulfur atoms per spin of approximately 300, while Linde 13X Molecular Sieve material mixed with sodium polysulfide and heated overnight to 500° C. and then for 3 hours at 600° C. has at 27° C. a ratio of sulfur atoms per spin of only 3.5; that is, the intensity of ESR signal and number of free spins in the second case are nearly one hundred times higher than in the first case.

A correlation between intensity of ESR signal and catalytic activity can be made only when the sulfur-containing free radicals are trapped in the same silica, silicate or aluminosilicate structure. A fair correlation between ESR signal and catalytic activity was found for Linde 3A Molecular Sieve containing 12% by weight of sulfur, but the correlation was poorer for Linde 13X Molecular Sieve which has a larger pore size and showed greater catalytic cracking activity. Perhaps this can be explained by assuming that in a catalytic reaction only those free radicals participate which are located near the surface (including the surface in the pores and cavities to which the reactant molecules have easy access). Thus for Linde 13X Molecular Sieve, the larger pore size permits greater permeation by reactants and accessibility to the free radicals throughout the total surface area.

The activated sulfur-containing siliceous catalysts prepared according to the present invention have been found to possess an unusually high activity for the cracking of hydrocarbons. The catalytic properties of these materials were investigated in a microreactor using the flow-technique in which a stream of helium was bubbled through a liquid hydrocarbon to vaporize the charge giving a mixture containing 10% hydrocarbon and 90% helium. Contact of the catalyst and charge was carried out at a temperature in the range of about 400° C. to 500° C. and at atmospheric pressure using a residence time of 9 to 10 seconds in the microreactor containing about 0.2 g. of catalyst.

As is well known in the art, the conversion scale approximates a scale of per-unit-catalyst activity only at low conversion, since conversion approaches a constant of 100 percent for arbitrarily large per-unit-catalyst activities. The relationship between fractional conversion C and catalytic activity, i.e. the catalytic activity rate constant per unit quantity of catalyst $k$ is usually and conveniently based on a first order rate law and may be expressed as follows:

$$C = 1 - e^{k\tau}$$

where $\tau$ is residence time. When catalytic activity is compared at a given residence time in the case of two comparative tests, this relationship results in the following relationship between the activity ratio and the observed fractional conversions in the two cases $C_1$ and $C_2$:

$$\alpha = \frac{k2}{k1} = \log \frac{1}{1-C_2} \Big/ \log \frac{1}{1-C_1}$$

In this manner the increase of activity between the sulfur-containing siliceous catalysts and their starting materials (e.g. kaolin, silica, natural and synthetic zeolites and molecular sieves, natural clays, etc.) can be conveniently noted regardless of the conversion.

The reactions promoted by the activated sulfur-containing siliceous catalysts described herein include conversion of certain classes or organic compounds, including cracking of paraffinic, olefinic, aromatic and naphthenic hydrocarbons as well as mixtures thereof (for example petroleum fractions, particularly those boiling in the gas oil range); disproportionation of aromatics; isomerization and polymerization of olefins; isomerization of terpenes; alkylation, dealkylation, hydrodesulfurization, dehydrogenation and oxidation of aromatic hydrocarbons.

The cracking of hydrocarbons and particularly petroleum fractions containing considerable amounts of sulfur compounds represents an especially advantageous use of the activated sulfur-containing siliceous catalysts of the present invention, the activity of these catalysts being little affected by poisoning by $H_2S$, thiophene and other organic sulfur compounds. During the cracking reaction, these organic sulfur compounds are partly desulfurized and the $H_2S$ and sulfur released are mostly absorbed by the catalyst.

The nature of the products of the cracking reaction may be accurately controlled, since the temperature at which the process is carried out is usually much lower than in cases where a pure aluminosilicate is used as a catalyst. Lower temperatures are especially desirable in the cracking of normal paraffins having short carbon chains, e.g. n-hexane.

The following examples will serve to illustrate the method of the invention without limiting the same:

Example 1

1 g. of kaolin with a particle size approximately 0.150 to 0.075 mm. was activated by heating to 500° C. in vacuum for 12 hours, and cooled and mixed with 0.5 g. of $Na_2S_5$. The mixture was heated in vacuum to 120° C., sealed in a quartz tube, and heated 48 hours to 750° C.

As a blank probe 1 g. of pure kaolin was treated in the same way, except for the addition of the sodium polysulfide. The materials so obtained were employed as catalyst in cracking 2,3-dimethylbutane. A stream of helium was bubbled through liquid 2,3-dimethylbutane to vaporize the charge giving a mixture containing 10% 2,3-dimethylbutane and 90% helium. Contact of the catalyst and charge was carried out at atmospheric pressure, utilizing a residence time of 9 seconds in a small microreactor containing 0.2 g. of catalyst at 500° C. The results are shown in Table II.

TABLE II

| Catalyst | T., ° C. | Time on stream (min.) | Percent Converted | α | Percent Cracked | α |
|---|---|---|---|---|---|---|
| Pure kaolin | 500 | 15 | 1.14 | | 0.97 | |
|  | 500 | 60 | .88 | | 0.65 | |
| Kaolin catalyst regenerated with 250 cc. $O_2$/g. | 500 | 15 | 1.33 | | 1.16 | |
| Sulfur-containing kaolin catalyst | 500 | 15 | 17.4 | 16.7 | 6.0 | 6.3 |
|  | 500 | 60 | 14.2 | 17.9 | 5.2 | 8.2 |
| Sulfur-containing kaolin catalyst activated with 25 cc. $O_2$/g. | 500 | 15 | 34.6 | 31.7 | 30.5 | 31.3 |

Samples of the gaseous products were analyzed by gas chromatography at specified intervals. The cracked products ranged from $C_5$ down to $C_1$ with propylene being the major component. The conversion products included minor amounts of polymerization products as well as the $C_1$–$C_5$ hydrocarbons.

Example 2

0.25 gram of porous silica with pore diameter approximately 40–90 A. was activated by heating in vacuum overnight at 300° C. cooled, and mixed with 0.1 g. of $Na_2S_5$ and heated again in vacuum to 120° C. for 2 hours. Then air was admitted to the tube which was sealed and heated overnight slowly to 520° C.

As a blank test, 0.25 g. of pure silica was treated in the same way except for the addition of the sodium polysulfide.

Both materials were employed in the cracking of 2,3-dimethylbutane. The conditions of cracking reaction were the same as described in Example 1. The results are given in Table III.

TABLE III

| Catalyst | T., ° C. | Time on stream (min.) | Percent converted | α | Percent cracked | α |
|---|---|---|---|---|---|---|
| Pure silica | 450 | 15 | .28 | | .14 | |
|  | 500 | 30 | 1.25 | | .6 | |
| Sulfur-containing silica catalyst | 450 | 15 | 8.4 | 31.3 | 3.0 | 22.1 |
|  | 500 | 30 | 31.3 | 30.0 | 24.4 | 43.7 |

Example 3

The procedure of Example 2 was repeated with one exception—the sample was sealed under high vacuum and then heated overnight slowly to 520° C. The results of cracking 2,3-dimethylbutane are shown below in Table IV.

TABLE IV

| Catalyst | T., ° C. | Time on stream (min.) | Percent Converted | α | Percent Cracked | α |
|---|---|---|---|---|---|---|
| Pure silica | 450 | 15 | .28 | | .14 | |
|  | 500 | 30 | 1.25 | | .6 | |
| Sulfur-containing silica catalyst | 450 | 15 | 3.9 | 10.9 | 2.9 | 21.4 |
|  | 500 | 30 | 3.9 | 3.2 | 1.5 | 2.4 |
| Sulfur-containing silica catalyst activated with 25 cc. $O_2$/g. | 500 | 15 | 22.2 | 20.0 | 14.8 | 25.0 |

Example 4

0.2 g. of Linde 13X Molecular Sieve was activated in a microreactor by heating in vacuum to 400° C. for 3 hours, cooled, mixed with 0.05 g. of $Na_2S_5$, evacuated at 110° C. (30 minutes/high vacuum) and heated to 580° C. over a two-hour period. As a blank test, 0.2 g. Linde 13X was treated in the microreactor in the same way except for the addition of the sodium polysulfide.

Both materials were then employed in the cracking of 2,3-dimethylbutane. The conditions of cracking were the same as described in Example 1. The results are given in Table V.

TABLE V

| Catalyst | T., ° C. | Time on stream (min.) | Percent converted | α | Percent cracked | α |
|---|---|---|---|---|---|---|
| Pure Linde 13X | 400 | 15 | .40 | | .36 | |
|  | 500 | 30 | 3.39 | | 3.10 | |
| Linde 13X with sulfur free radicals | 400 | 15 | 3.30 | 8.5 | 3.10 | 8.8 |
|  | 500 | 30 | 26.6 | 9.0 | 23.6 | 8.5 |

Example 5

0.2 g. of Linde 3A Molecular Sieve was activated in a microreactor by heating in vacuum to 350° C. for 3 hours, cooled, mixed with 0.05 g. of sulfur, evacuated at 100° C. (30 minutes high vacuum) and heated to 450° C. overnight. As a blank test, 0.2 g. of Linde 3A was treated in the microreactor in the same way except for the addition of the sulfur.

Both materials were then employed in the cracking of 2,3-dimethylbutane. The conditions of cracking were the same as described in Example 1. The results are given in Table VI.

TABLE VI

| Catalyst | T., °C. | Time on stream (min.) | Percent converted | $\alpha$ | Percent cracked | $\alpha$ |
|---|---|---|---|---|---|---|
| Pure Linde 3A | 400 | 15 | .11 | | .11 | |
|  | 500 | 30 | 2.43 | | 2.39 | |
| Linde 3A with sulfur biradicals | 400 | 15 | .95 | 8.8 | .64 | 5.9 |
|  | 500 | 30 | 5.89 | 2.5 | 5.76 | 2.5 |

Example 6

U.S. Pat. 3,250,728 (issued May 10, 1966, Miale et al.) covers the impregnation of certain crystalline metal aluminosilicates (molecular sieves) with ammonium sulfide solution, followed by heating (at about 425°–575° C.) to remove ammonia and to form a hydrocarbon cracking catalyst. In order to show that this treatment with ammonium sulfide is not equivalent to the present invention where sulfur vapor (or alkali metal and alkaline earth metal polysulfide vapors) are used, the following experiments were carried out.

Molecular sieves Linde 3A, 5A and 13X were treated with (a) ammonium sulfide solution and then heated (as in U.S. Pat. No. 3,250,728), and (b) with sulfur (3A and 5A) or sodium polysulfide (13X) vapors according to the present invention. The treatment with ammonium sulfide solution and heating followed the procedure of Example 1 of U.S. Pat. No. 3,250,728 except temperatures of about 450° C. were used for the 3A and 5A (these sieves changed form above this temperature of 450° C.), and about 535° C. for the 13X. The treatments, according to the present invention, were carried out at the same temperatures but for overnight.

The catalysts of (a) and (b) were subjected to ESR measurements and no signal was observed for the (a) catalysts at the g-values for sulfur-containing free radicals, while the (b) catalysts gave strong signals (13X-single line at g-value about 2.028, and 3A and 5A-triplet at the g-values for the sulfur-containing biradical) indicating the presence of large amounts of sulfur-containing free radicals. The catalytic activity for cracking 2,3-dimethylbutane was compared for catalysts (a) and (b); (a) had no more activity than the untreated molecular sieves while (b) had activity about 8 times greater for the 13X sieve and about 3 times greater for the 3A and 5A sieves.

It should be noted that the ammonium sulfide treatment according to U.S. Pat. No. 3,250,728 is intended only for molecular sieves where replacement of cations by $NH_4^+$ can take place and, once effected, the ammonia is then removed to give the hydrogen form of the sieve. In the present invention no exchange or removal of cations is carried out.

Example 7

Three small crystals of sodalite (total weight 5 g.) were evacuated in a quartz tube under vacuum at 300° C. for 6 hours, then cooled. A mixture of 1.2 g. of $Na_2S$ and 2.0 g. of S was added to the quartz tube which was evacuated for 2 hours at 110° C., sealed and then heated up to 750° C. in a pressure bomb under outside pressure of helium at 600 p.s.i. over a period of 24 hours. The crystals were transformed into lazurite in about 50% yield but fully transformed on the crystal surfaces.

Example 8

One crystal of nepheline, weight about 10 g., was evacuated in a quartz tube under vacuum at 300° C. for 12 hours, then cooled, and 0.8 g. $Na_2S$ and 1.3 g. S were added to the tube. The crystal and additives were evacuated in the quartz tube for 2 hours at 110° C., then the tube was sealed and heated in a pressure bomb under outside pressure of helium (1000 p.s.i.) during 60 hours to 700° C. The crystal was transformed into lazurite to a small extent only (about 10%) giving an interesting gem stone (mixture of white and intensive blue).

Example 9

The partially transformed nepheline crystal from Example 8 was evacuated under vacuum at 300° C. for 24 hours, then cooled, and 0.4 g. $Na_2S$ and 0.65 g. S were added. The crystal and additives were evacuated in a quartz tube for 2 hours at 110° C. The tube was then sealed and heated in a pressure bomb under outside pressure of helium (1000 p.s.i.) to 750° C. over 72 hours. The crystal was about 80% transformed into lazurite.

Example 10

One crystal of nepheline (20 g.) was heated at 70° C. with 100 ml. of 7% $HNO_3$ for 30 minutes and washed with distilled water. The crystal with fresh surface was then evacuated in a quartz tube under vacuum at 300° C. for 16 hours, then cooled, and 0.5 g. of $Na_2S_5$ was added. The crystal and polysulfide in the quartz tube were evacuated at 120° C. for 2 hours. The tube was then sealed and heated in a pressure bomb under outside pressure of helium (900 p.s.i.) to 845° C. over 48 hours. The crystal was fully transformed into lazurite.

I claim:

1. A method for preparing a sulfur-containing siliceous crystalline material comprising heating, in an inert atmosphere, a siliceous crystalline material selected from the group consisting of silica and metal silicates in the presence of a member selected from the group consisting of sulfur, alkali metal polysulfides, alkaline earth metal polysulfides, a mixture of sulfur and an alkali metal sulfide and a mixture of sulfur and an alkaline earth metal sulfide to a temperature in the range of from about 200° C. to about 1200° C. to impregnate the siliceous crystalline material with sulfur-containing free radicals.

2. The method according to claim 1 wherein the temperature range is from about 350° C. to about 700° C.

3. The method according to claim 1 wherein the siliceous crystalline material is a metal aluminosilicate which is heated with a polysulfide selected from the group consisting of alkali metal and alkaline earth metal polysulfides to a temperature in the range of about 500° C. to 1200° C.

4. The method according to claim 3 wherein an additional impregnation with sulfur-containing free radicals is carried out on the sulfur-containing free radical impregnated siliceous material at a temperature in the range of about 350° C. to 500° C.

5. The method according to claim 1 including the step of contacting the sulfur-containing free radical impregnated catalyst with from 5 to 50 cc. of oxygen per gram of catalyst at a temperature in the range of about 300° C. to about 600° C. to promote the activity thereof.

6. The method according to claim 1 wherein the siliceous crystalline material is an aluminosilicate mineral having an open zeolite-structure and which is heated to a temperature in the range of about 500° C. to 1200° C.

7. The method according to claim 1 wherein the heating step is carried out over a period of time from about 15 minutes to several days.

8. The method according to claim 1 wherein the sulfur compound is used in an amount at least 5% by weight, based on the weight of the siliceous material to be activated.

9. A method for preparing a sulfur-containing siliceous catalyst comprising heating kaolin in an inert atmosphere with an alkali metal polysulfide to a temperature of about 600° C. to 900° C. to impregnate the kaolin with sulfur-containing free radicals.

10. A method for preparing a sulfur-containing siliceous crystalline material comprising heating a mineral selected from the group consisting of nepheline and sodalite to a temperature within the range of about 700° C. to 900° C. under outside pressure of an inert gas at 100 to 2000 p.s.i. with a member selected from the group consisting of (a) alkali metal polysulfides, and (b) a mixture of sulfur and an alkali metal sulfide for 24 to 72 hours.

11. A sulfur-containing siliceous catalyst comprising a siliceous crystalline material selected from the group consisting of silica and metal silicates containing dispersed throughout its structure stable, trapped, sulfur-containing free radicals.

12. The sulfur-containing siliceous catalyst of claim 11 having a structure which is substantially saturated with sulfur-containing free radicals.

13. A sulfur-containing siliceous catalyst as defined in claim 11 having a triplet electron spin resonance spectrum with $g$-factors of approximately 2.047, 2.032 and 2.010.

14. An aluminosilicate mineral selected from the group consisting of nepheline and sodalite impregnated with sulfur-containing free radicals.

References Cited

UNITED STATES PATENTS

| | | | |
|---|---|---|---|
| 2,402,626 | 6/1946 | Howk | 252—439 |
| 2,402,683 | 6/1946 | Signaigo | 252—439 |
| 2,402,684 | 6/1946 | Signaigo | 252—439 |
| 3,337,447 | 8/1967 | Rigney et al. | 252—439 XR |

FOREIGN PATENTS

| | | |
|---|---|---|
| 643,459 | 9/1950 | Great Britain. |
| 1,029,304 | 5/1966 | Great Britain. |

PATRICK P. GARVIN, Primary Examiner

U.S. Cl. X.R.

106—42; 208—109, 118, 122, 245